US007775712B1

(12) United States Patent
Thieman

(10) Patent No.: US 7,775,712 B1
(45) Date of Patent: Aug. 17, 2010

(54) MODIFIED GRID CABINET ASSEMBLY

(75) Inventor: Edward Thomas Thieman, Ft Lauderdale, FL (US)

(73) Assignee: Virtual Imaging, Inc., Dearfield Beach, FL (US)

( * ) Notice: Subject to any disclaimer, the term of this patent is extended or adjusted under 35 U.S.C. 154(b) by 67 days.

(21) Appl. No.: 11/451,933

(22) Filed: Jun. 13, 2006

(51) Int. Cl.
*H05G 1/02* (2006.01)
*G03B 42/04* (2006.01)

(52) U.S. Cl. ................................. 378/189; 378/186

(58) Field of Classification Search .............. 378/19, 378/37, 41, 42, 62, 137–170, 172–175, 182, 378/189–192, 204, 210, 185, 186; 250/363.05, 250/363.08, 370.01, 370.08, 370.09, 395, 250/526
See application file for complete search history.

(56) References Cited

U.S. PATENT DOCUMENTS

| | | | | |
|---|---|---|---|---|
| 2,276,137 | A | * | 3/1942 | Young .......................... 378/164 |
| 3,826,922 | A | * | 7/1974 | Ingles .......................... 378/181 |
| 4,387,468 | A | | 6/1983 | Fenne et al. |
| 4,416,020 | A | * | 11/1983 | Wagner et al. ............... 378/181 |
| 4,426,724 | A | * | 1/1984 | Cutter .......................... 378/181 |
| D273,892 | S | | 5/1984 | Fenne et al. |
| 4,752,948 | A | | 6/1988 | MacMahon |
| 5,008,921 | A | | 4/1991 | Kaul et al. |
| D342,137 | S | | 12/1993 | Guentner |
| RE35,025 | E | | 8/1995 | Anderton |
| 5,608,774 | A | | 3/1997 | Polichar et al. |
| 5,661,309 | A | | 8/1997 | Jeromin et al. |
| 5,844,961 | A | * | 12/1998 | McEvoy et al. ............ 378/98.8 |
| 5,872,557 | A | | 2/1999 | Wiemer et al. |
| 5,877,501 | A | | 3/1999 | Ivan et al. |
| D417,503 | S | | 12/1999 | Spoljaric |
| 6,282,264 | B1 | | 8/2001 | Smith et al. |
| 6,296,386 | B1 | | 10/2001 | Heidsieck et al. |
| 6,398,409 | B1 | | 6/2002 | Brooks |
| 6,450,684 | B2 | | 9/2002 | Kobayashi |
| 6,533,453 | B1 | | 3/2003 | Heidsieck et al. |
| 6,592,257 | B1 | | 7/2003 | Heidsieck et al. |
| 6,754,306 | B2 | | 6/2004 | Cho et al. |
| 6,772,461 | B2 | | 8/2004 | Gaspar |
| 6,805,484 | B2 | | 10/2004 | Kuramoto et al. |
| 6,851,851 | B2 | | 2/2005 | Smith et al. |
| D502,543 | S | | 3/2005 | Phleps et al. |
| 7,144,157 | B2 | * | 12/2006 | Dippl et al. ................. 378/177 |

(Continued)

FOREIGN PATENT DOCUMENTS

WO WO 9634416 A1 * 10/1996

*Primary Examiner*—Edward J Glick
*Assistant Examiner*—Thomas R Artman
(74) *Attorney, Agent, or Firm*—Lott & Friedland, P.A.

(57) ABSTRACT

A modified grid cabinet or "bucky" assembly intended for use with a digital imaging system and dimensioned and structured to retrofit a conventional film type x-ray device originally intended for use in combination with a conventional film bucky. The bucky assembly includes a frame having an at least partially hollow interior and a tray movably connected to the frame and slidably positionable between an outwardly extending open position and an inwardly disposed closed position. The tray is structured to support and position a digital sensor into an imaging position relative to the operative image capturing components of the digital imaging system. The tray includes a retaining assembly disposed and structured to removably retain the digital sensor in any a plurality of operative orientations including a portrait orientation and a landscape orientation.

15 Claims, 7 Drawing Sheets

U.S. PATENT DOCUMENTS

| | | | |
|---|---|---|---|
| 7,144,158 B2 * | 12/2006 | Dippl et al. | 378/177 |
| 7,165,884 B2 * | 1/2007 | O'Dea et al. | 378/186 |
| 2001/0022833 A1 | 9/2001 | Kobayashi | |
| 2002/0090055 A1 | 7/2002 | Zur et al. | |
| 2005/0117709 A1 * | 6/2005 | Dippl et al. | 378/189 |
| 2007/0272873 A1 * | 11/2007 | Jadrich et al. | 250/370.11 |

* cited by examiner

MODIFIED GRID CABINET ASSEMBLY

BACKGROUND OF THE INVENTION

1. Field of the Invention

The present invention is directed to a modified grid cabinet or "bucky" assembly structured to allow an x-ray device, using a conventional film bucky, to be retrofitted for use with a digital imaging system. A frame, dimensioned and configured to accomplish the intended retrofitting, houses a tray reciprocally slidable relative to the frame and into either a closed position or an open position. The tray removably retains a sensor plate in any one of a plurality of operative orientations, including a portrait orientation and a landscape orientation.

2. Description of the Related Art

Medical x-ray equipment conventionally uses x-ray film contained in a lightproof cassette. The cassette is positioned adjacent to the patient, wherein the patient is disposed between an x-ray source and the cassette, when loaded with an image capturing, sensor device. During exposure, x-rays penetrate the desired location of the patient's body allowing the x-ray film to capture an appropriate image of an intended body part on the x-ray film. Longstanding medical technology has resulted in a variety of standard protocol for imaging various parts of the body which are typically reviewed by x-ray. As such, the film cassette is disposed in different positions relative to the patient. By way of example only, chest x-rays are often performed with the patient standing and having the individual's chest or back pressed against a vertically oriented film cassette. However, the imaging of the various parts of a patient's body is done with the film cassette located at various orientations relative to the body. Additional operative positions include the film cassette being disposed beneath the patient, within a specified compartment or area, wherein the patient is disposed in a horizontal or reclined position above the film cassette. The x-ray generating equipment is then placed over the patient in aligned registry of the location of the x-ray cassette.

Fairly recent advancements in medical technology have resulted in the development of equipment that generates electrical signals related to local x-ray exposure. Equipment incorporating a digital array which serves to eliminate film as the recording or capturing medium may be referred to as flat panel x-ray detectors and demonstrate certain advantages relative to conventional film x-ray type of facilities. Moreover, recognized disadvantages or problems associated with film or other processing of film type equipment are overcome. While relatively costly, digital imaging systems of the type generally described above are prevalent, especially in modern day medical facilities. As such, a digital imaging system typically comprises a computer, monitor and sensor plate which is placed under or adjacent to the patient, dependent on the particular body parts to be viewed. Further, digital imaging systems are particularly adaptable to capture images of patients which, because of their condition, find it difficult or unable to be moved from their bed to a conventional x-ray table.

Accordingly, it is clear that digital systems of the type described have noted advantages in spite of the higher cost factor. While the use of digital imaging systems is becoming more wide spread, there still exists a significant number of conventional film type x-ray facilities available and in use. Accordingly, there would be significant benefits in the ability to retrofit existing x-ray facilities, which use conventional film cassettes, in a manner which would render them compatible for use with a digital imaging system. Such a retrofitting assembly should preferably include a modified grid cabinet or bucky assembly which is dimensioned, configured and structured to be placed within a specified compartment area normally intended for the placement of conventional film type buckys.

Further, a proposed modified grid cabinet should be capable of quickly and easily loading and unloading a sensor plate or digital sensor device such that it can be quickly and efficiently placed in an imaging position. Further, the structural features associated with a preferred and proposed retrofitting assembly should be such as to quickly and easily orient the sensor plate or digital sensor in any a plurality of preferred operative orientations, including a landscape orientation or a portrait orientation. Additionally, a proposed bucky assembly of the type described should be capable of being used with an x-ray table, an upright chest or vertically orientated wall support, as well known in the medical arts.

SUMMARY OF THE INVENTION

The present invention is directed to a modified grid cabinet or "bucky" assembly intended to provide a mechanism which allows an x-ray device, using a conventional film bucky, to be retrofitted for use with a digital imaging system. As such, the bucky assembly of the present invention is used to secure a sensor plate or digital sensor device into either an x-ray table or chest stand. The versatility of the bucky assembly of the present invention is further demonstrated by allowing it to be removed for use on immobile patients. Moreover, the dimension, configuration and overall structure facilitates its intended purpose of replacing a standard film type bucky commonly used in the radiographic industry.

More specifically, the bucky assembly of the present invention comprises a frame having an at least partially hollow configuration and including side and end peripheral frame segments and an opening extending along one side or end thereof. A tray is movably connected to the frame and is selectively positionable between an open position and a closed position. Moreover, the frame and the tray are cooperatively structured to facilitate sliding and reciprocal movement of the tray into and out of the hollow interior portion of the frame through the open side or end thereof. Accordingly, when the tray is loaded with the digital sensor it is operative to dispose the sensor into an imaging position when selectively disposed in the closed position on the interior of the frame. When in the open position the tray is positioned to removably receive the sensor plate or digital sensor thereon, such that the sensor plate is movable with the tray into the imaging position on the interior of the frame.

In order to facilitate the intended mounting of the sensor plate on the tray, a latch assembly is interconnected to the frame and the tray. Moreover, the latch assembly is structured to releasably secure the tray in the open position. Accordingly, when the tray is removed from its closed position on the interior of the frame, and extended outwardly there from through the open end it is removably secured in the fully open position. The latch assembly is therefore structured to facilitate use of the frame as a support platform, such that the sensor plate may be securely mounted on the tray in any one of a plurality of predetermined operative orientations. Specific or predetermined manipulation of the tray serves to release the latch assembly allowing it to be passed back into the interior of the frame into the closed position, such that the sensor plate retained on the tray is disposed in the intended and preferred imaging position.

In order to further demonstrate the structural and operative versatility of the modified grid cabinet or bucky assembly of the present invention, a retaining assembly is provided on the tray assembly so as to be movable therewith and more specifically to removably retain the sensor plate thereon in the preferred imaging position. The structural features of the retaining assembly facilitate the selective positioning of the sensor plate, when supported on the tray, in any one of a plurality of operative orientations more specifically defined by a portrait orientation and/or a landscape orientation.

Therefore, in an at least one preferred embodiment the retaining assembly comprises a plurality of retaining members preferably structured to engage corner portions of the sensor plate or digital sensor, when it is in either the aforementioned portrait or landscape orientations. Moreover, the plurality of retaining members are independently and/or collectively structured to removably retain the digital sensor regardless of the operative orientation in which it is positioned on the tray. Such construction enables the sensor plate to be disposed in either the portrait position or landscape position. Yet additional features of at least one preferred embodiment of the retaining assembly is the structuring of one or more of the retaining members to provide for the passage of power cords, cables, or like structures, attached the digital sensor, to pass there through, when the digital sensor is in either the aforementioned portrait or landscape positions.

The use of the modified grid cabinet or bucky assembly of the present invention comprises an individual pulling the tray outwardly from its closed position within the interior of the frame until the latch assembly is automatically disposed into its "latched" position. When the tray is removably secured in this latched position, it serves as a supportive platform to facilitate the accurate mounting of the digital sensor or sensor plate in its appropriate orientation on or within the tray. To release the latching assembly, the user exerts an additional outwardly directed pulling force on the tray, which serves to position it in an at least a minimal additional distance, outwardly from the frame. This additional outward force serves to release the latching assembly from the above-noted latched, position. Thereafter, the tray is able to slide back through the open end or side of the frame into the interior portion thereof so as to dispose the digital sensor into the imaging position.

The bucky assembly, with the digital sensor or sensor plate loaded therein, is then disposable under the patient in the same manner as a conventional film type bucky, such as when the patient is mounted on a bed, x-ray table or other supporting surface in a horizontal or reclined position. The patient is then further positioned and the exposure is made. As also set for the above, the bucky assembly of the present invention can also be used with a chest stand or other vertically mounted support, wherein the patient is positioned in at least a partially upright orientation, as is well known.

Yet additional structural and operative features of the bucky assembly of the present is an orientation assembly which facilitates a rotation of digital/sensor plate between the two preferred operative orientations or more specifically which allows a selective rotation of the sensor plate between the portrait and landscape positions.

Therefore, the bucky assembly of the present invention is specifically designed to be used with a digital imaging system of the type comprising a computer, monitor and aforementioned sensor plate. However, the dimensions and configurations of the bucky assembly are deliberately intended to facilitate the retrofitting of an x-ray capturing facility which normally uses conventional film and a conventional film type bucky.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
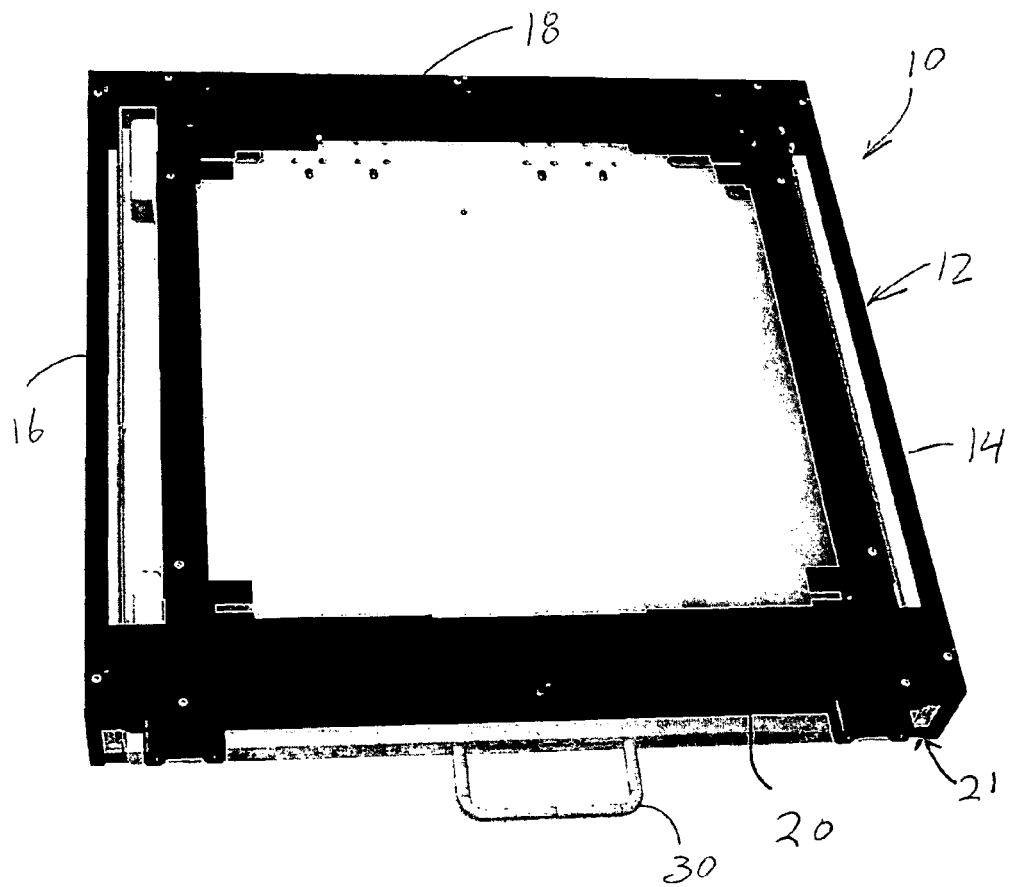
FIG. 1 is a perspective view of one preferred embodiment of the bucky assembly of the present invention in a closed position absent the presence of a sensor plate or like digital sensor.

As shown in the accompanying Figures, the present invention is directed toward a modified grid cabinet or "bucky" assembly generally indicated as 10 structured to facilitate the retrofitting of a conventional film type cabinet or bucky of an x-ray device so that it can be used with a digital imaging system. While not specifically disclosed, the digital imaging system of the type contemplated to be used with the bucky assembly 10 of the present invention conventionally includes a computer, monitor and sensor plate or digital sensor facility 32. The digital sensor 32 is typically placed adjacent to a patient, such as within a specified compartment area under a patient who is unable or finds it difficult to move from their bed to a supporting x-ray table. However, it is emphasized that the modified grid cabinet 10 of the present invention may also be used with a chest stand or wall mounted assembly, wherein the imaging of predetermined parts of the user's body are captured while the patient is in an at least partially upright, versus a horizontal or reclined, orientation.

The modified grid cabinet or bucky 10 includes a frame generally indicated as 12 comprising a plurality of peripherally arranged frame segments including enclosed side frame segments 14 and 16 and at least one closed end segment 18. The remaining front, side or end segment 20 includes an opening or open face 21, which provides access to a hollow interior portion of the frame 12. Further, the interior of the frame 12 is specifically dimensioned, configured and structured to movably receive a tray 22 therein. The tray 22 includes a connecting assembly including movable rail segments 24 bordering opposite sides of the tray 22 as well as bottom supporting members 26 and 26'. As represented in FIGS. 2 and 2A the supporting members 26 and 26' are cooperatively disposed and structured to interconnect a bottom or undersurface portion 25' of a base 25 of the tray 22. A leading or front side or end of the tray 28 includes a handle structure 30 secured thereto and disposed and structured to facilitate placement of the tray 22 between an open position as demonstrated in FIGS. 2, 2A, 3, 4 and 6 and a closed position as represented in FIG. 1.

Figure 2:
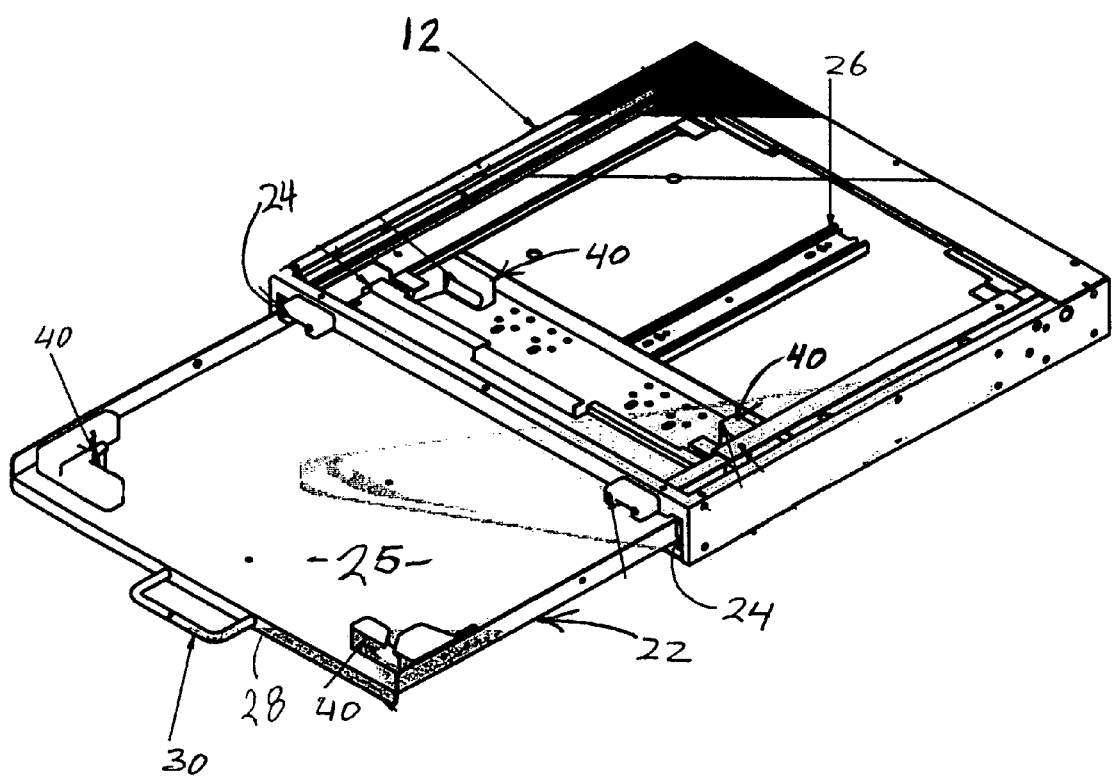
FIG. 2 is a perspective view of the embodiment of FIG. 1 with the tray in an open position ready for receiving a sensor plate.
Figure 2A:
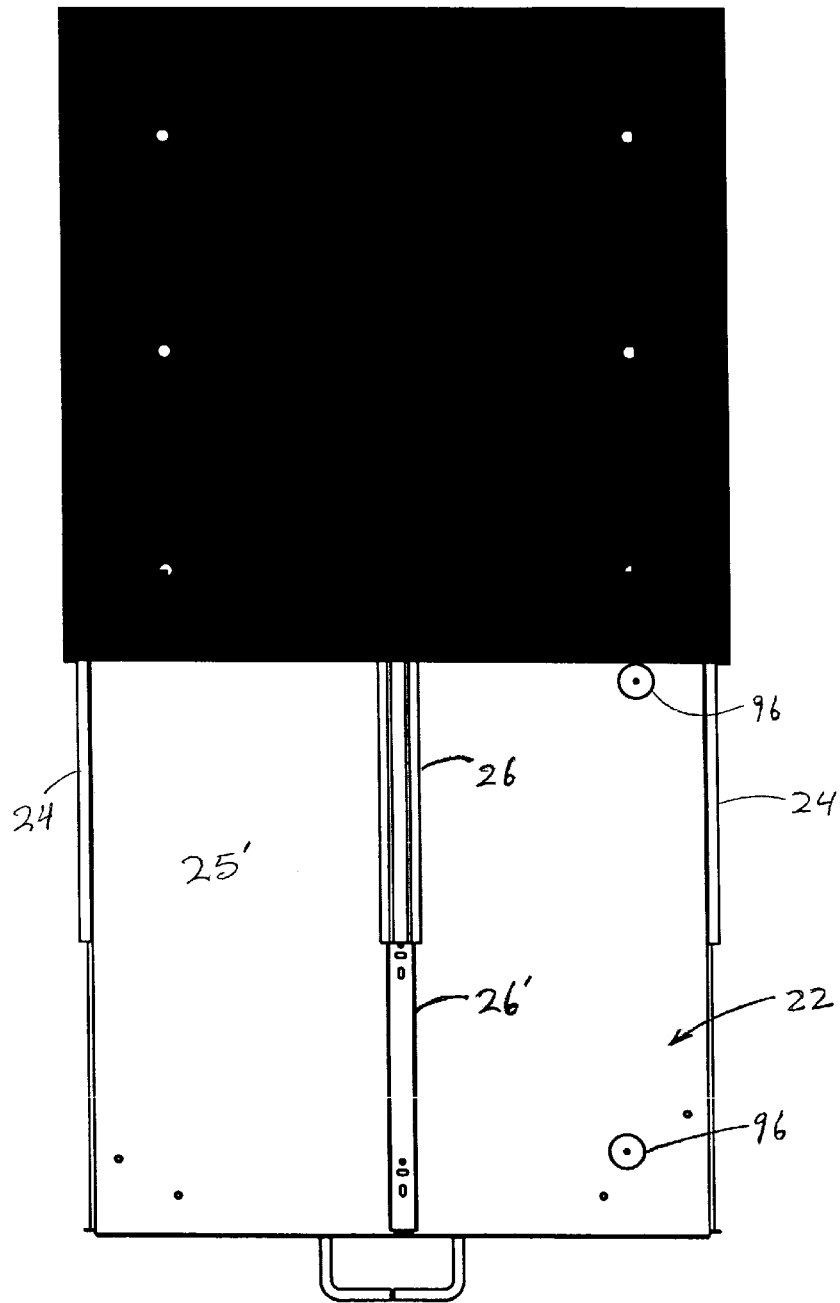
FIG. 2A is a bottom view of a portion of the bucky assembly of the embodiment of FIGS. 1 and 2.
Figure 3:
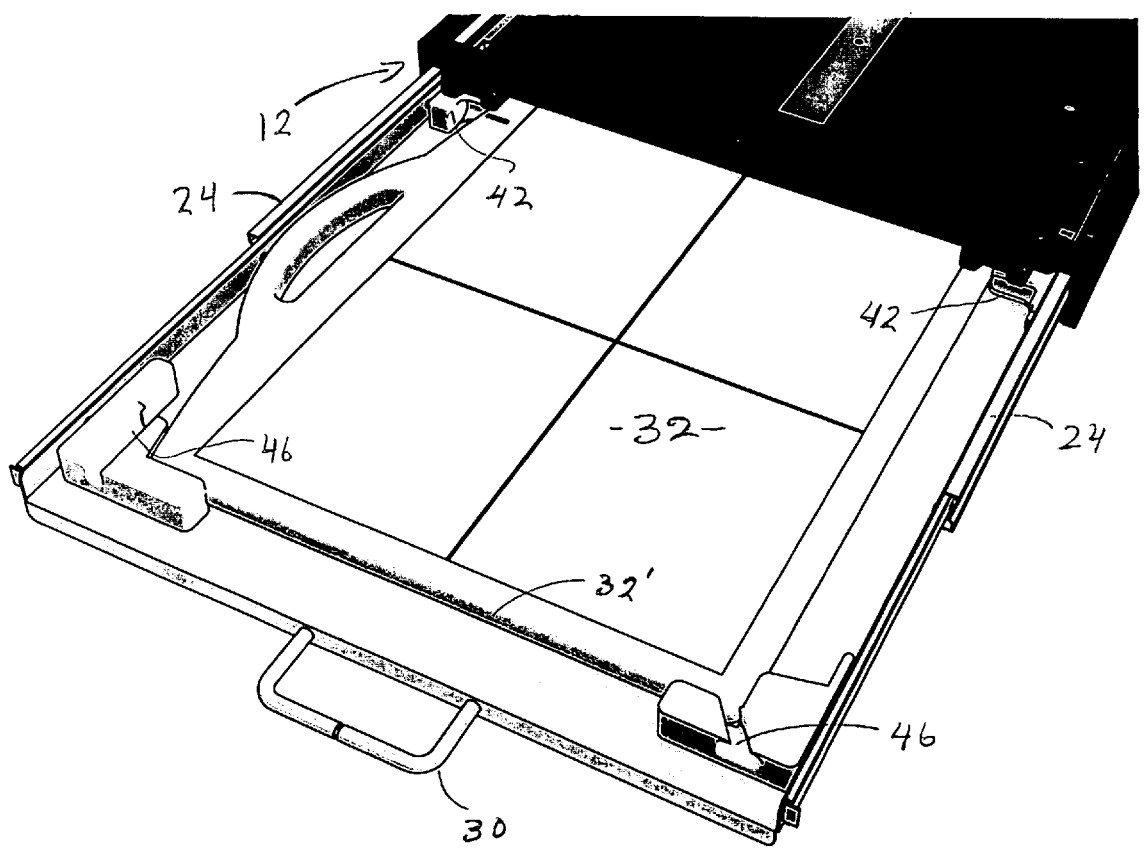
FIG. 3 is a perspective view in partial cutaway of the embodiments of FIGS. 1 and 2 with a sensor plate or digital sensor disposed in a portrait orientation, which defines one of a plurality of operative orientations.
Figure 4:
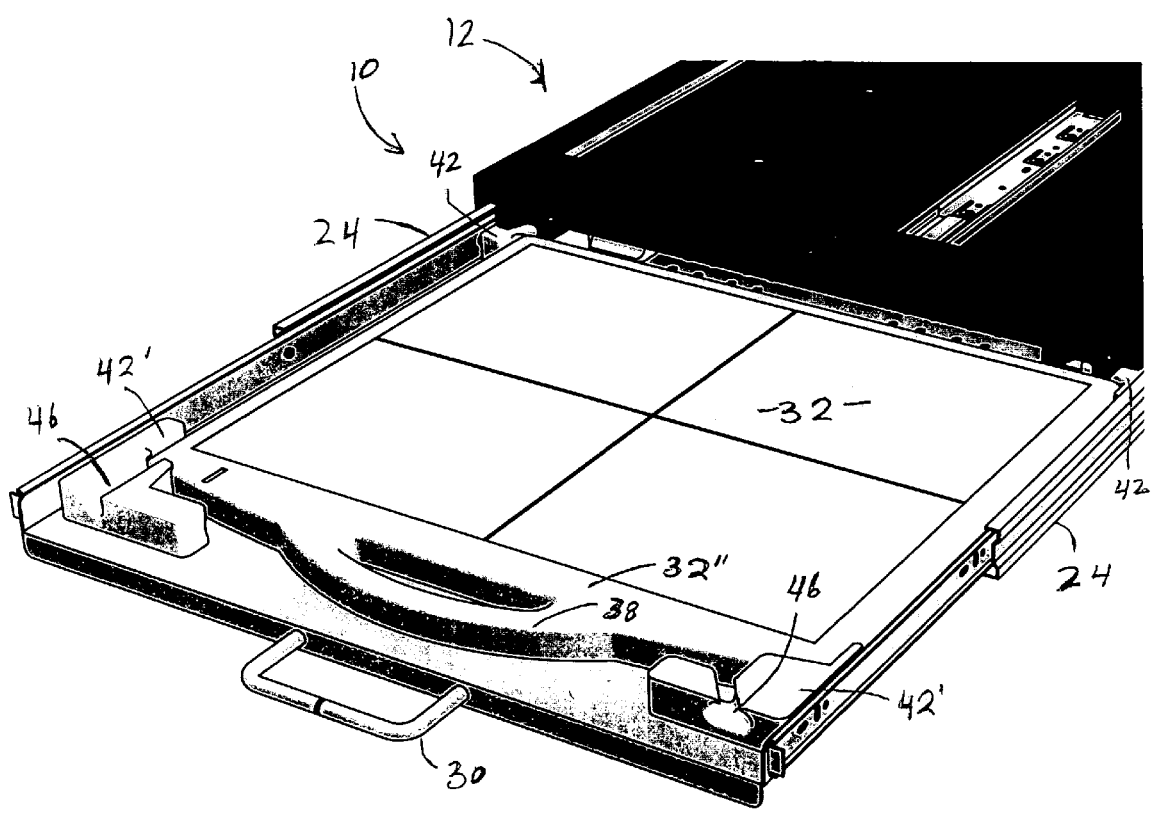
FIG. 4 is a perspective view in partial cutaway of the embodiment of FIGS. 1-2 with a digital sensor plate disposed in a landscape orientation, which defines one of a plurality of operative orientations.
Figure 5A:
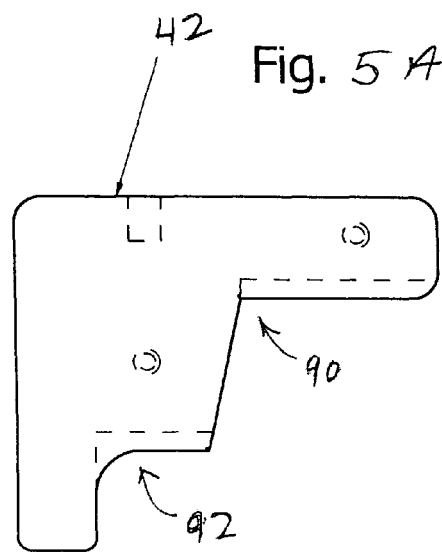
FIGS. 5A through 5D are each a plan view of one preferred embodiment of a retainer member structured to removably retain a digital sensor plate in either a portrait orientation or a landscape orientation.
Figure 5B:
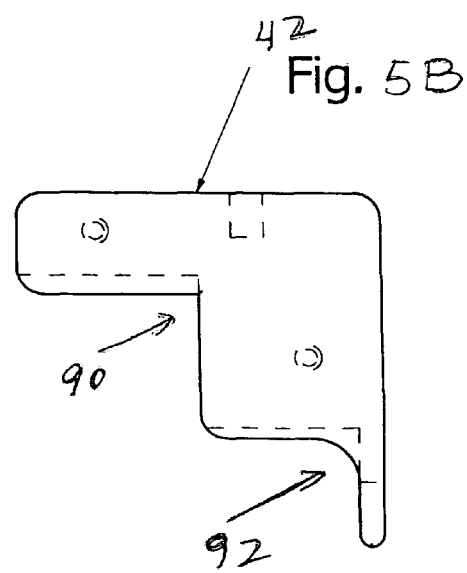
Figure 5D:
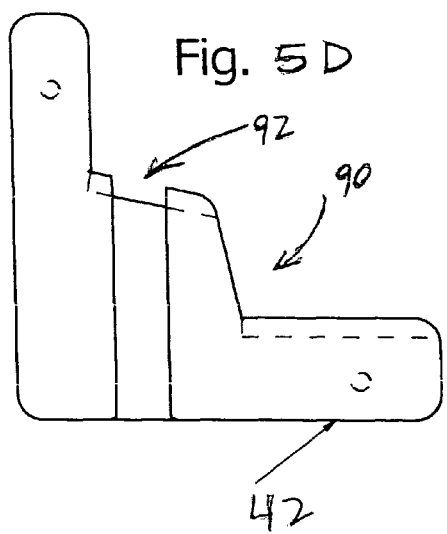
Figure 5C:
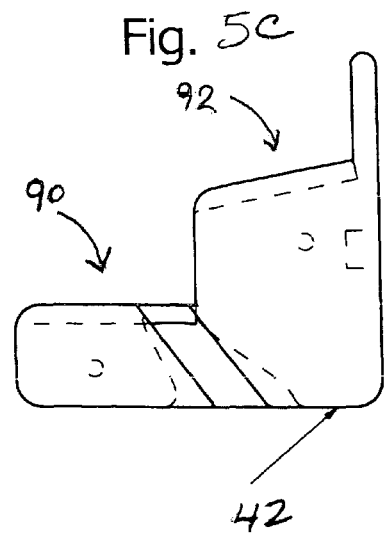

Accordingly, a connecting assembly, including the rail or like support components 24 and 26, 26' thereof, facilitates the selective placement of the tray 22 in either the closed or open positions, wherein the closed position of FIG. 1 serves to dispose a digital sensor or sensor plate 32, which is structured to capture images of the patient's body, in an imaging position. With reference to FIGS. 3 and 4, the digital sensor 32 is specifically structured to be operative with a digital imaging system of the type described above. Because of the additional structural and operative components of the bucky assembly 10, it is capable of placing the digital sensor 32 in any of a plurality of operative orientations. More specifically, such operative orientations include a portrait orientation as represented in FIG. 3 and the landscape orientation as demonstrated in FIG. 4. More specifically, when the digital sensor 32 is in the portrait orientation, as represented in FIG. 3, the lateral peripheral portion 32' thereof is closest to the outer portion and/or handle 30 of the tray 22. In contrast, when the digital sensor 32 is in the landscape orientation, as represented in FIG. 4, the peripheral portion 32" is closest to the outer end and/or handle 30 of the tray 22. Moreover, the tray 22 is specifically structured to accommodate the sensor plate 32 in either of the landscape or portrait positions and includes substantially peripherally disposed space sufficient to accommodate placement of a sensor plate handle 38 regardless of the sensor plate 32 being in either the portrait or landscape orientations, as generally described above.

Selective placement of the sensor plate 32 in either of the portrait or landscape orientations is facilitated through the provision of a retaining assembly generally indicated as 40 connected to or mounted on the tray 22 along interior portions thereof. As represented in FIGS. 2, through 5, the retaining assembly 40 includes a plurality of retaining members 42, preferably but not exclusively, positioned to removably retain corner portions of the sensor plate 32 regardless of the sensor plate 32 being in either the portrait orientation of FIG. 3 or the landscape orientation of FIG. 4. Therefore, at least some, but preferably each, of the retaining members 42 include a construction which is adaptable to accommodate different corner portions of the digital sensor plate 32, as well as the distance there between, depending upon the digital sensor plate 32 being in either the portrait or landscape orientation.

With specific reference to FIGS. 5a through 5d, the plurality of retaining members 42 may have different dimensions and configurations based, at least in part, on their location on the tray or slide member 25. By way of example, the retaining members 42 in FIGS. 5a through 5d are respectively representative of the individual retaining members located in the rear left hand corner; the rear right hand corner; the front right hand corner and the front left hand corner. Structural features associated both individually and collectively with the retaining members 42 include the provision of two adjacently positioned independently disposed and structured receiving recesses as at 90 and 92. Accordingly each of the recesses 90 of each of the retaining member 42 are collectively and cooperatively disposed and structured to removably engage the corners of the digital sensor plate 32 when it is disposed in a portrait orientation. In contrast, each of the receiving recesses 92 of the plurality of retaining members 42 are collectively and cooperatively disposed to removably engage the corners of the sensor plate 32 when it is disposed in a landscape orientation. With reference to FIGS. 3 and 4, the various retaining members 42 are operatively associated with the corners of the sensor plate 32 while in the portrait orientation of FIG. 3 as well as the landscape orientation of FIG. 4.

Additional structural features of at least some of the retaining members 42, such as, but not limited to the retaining members 42' includes specifically disposed and configured channel portions 46 which may vary in dimension, configuration and location but which are structured to accommodate the placement of a connecting cord, operative line or other facility associated with the sensor plate 32.

Yet an additional structural feature of a most preferred embodiment of the modified grid cabinet 10 of the present invention is the provision of a latch assembly. The latch assembly may be directly associated with or otherwise operatively connected to the support components 24 and/or 26, 26' of the connecting assembly. Specifically, the latching assembly is specifically structured to removably secure or temporarily maintain the tray 22 in its open position so as to further facilitate the receiving and/or proper placement, in any of the aforementioned portrait or landscape orientations within the interior or the tray 22. Further, when the tray 22 is in the open position of FIG. 2 the latching assembly serves to removably secure the tray in such a position. This "latched" position facilitates the tray 22 generally defining a support platform such that the digital sensor plate 32 can be properly oriented. Such proper orientation includes the removable retaining engagement of the corner, retaining members 42 with appropriate ones of the corner portions of the sensor plate 32, dependent on the digital sensor plate 32 being in the aforementioned portrait and/or landscape orientations. However, the latch assembly is further specifically structured to facilitate selective removal of the tray 22, such as when loaded with the sensor plate 32, in order to facilitate its placement back into the imaging position of the sensor plate such as when the tray 22 is in its closed position of FIG. 1.

Further explanation of the structure and operation of the bucky assembly 10 of the present invention is provided through a description of the use and/or operation thereof. More specifically, a user exerts an outwardly pulling force on the handle 30 so as to dispose the tray 22 in the open position, ready for receipt of the digital sensor plate 32. When in such extended, open position, the tray 22 is "latched" so as to be removably secured or maintained in the open position. The digital sensor or sensor plate 32 is then appropriately inserted into retaining engagement with the retaining assembly 40 defined at least in part by the plurality of retaining members 42, as described above. Its placement will include the selective positioning of the sensor plate 32 in either of the portrait or landscape orientations. Disconnection or removal of the tray from its secured outwardly extended open position is accomplished by exerting an additional outward force on the tray 22, such as by the user grasping and pulling the handle 30. This additional or supplementary outward force serves to operate the structure of the latching assembly in a manner which releases the latch and allows the tray 22 to slide back through the open face 21 into the interior of the tray 12 and into the closed position, such that the digital sensor 32 is disposed in the imaging position. The modified grid cabinet 10 is then loaded into an appropriate or specified compartment beneath or immediately adjacent a patient in the same manner as a film type bucky. The patient is properly positioned or oriented relative to the digital sensor plate 32 and the exposure is made.

The retrofitting of a conventional x-ray device normally using a conventional film type bucky is facilitated by properly dimensioning, configuring and structuring the various components of the modified grid cabinet assembly 10 specifically including the exterior dimensions of the cabinet frame 12 for placement within a film type bucky compartment.

Figure 6:
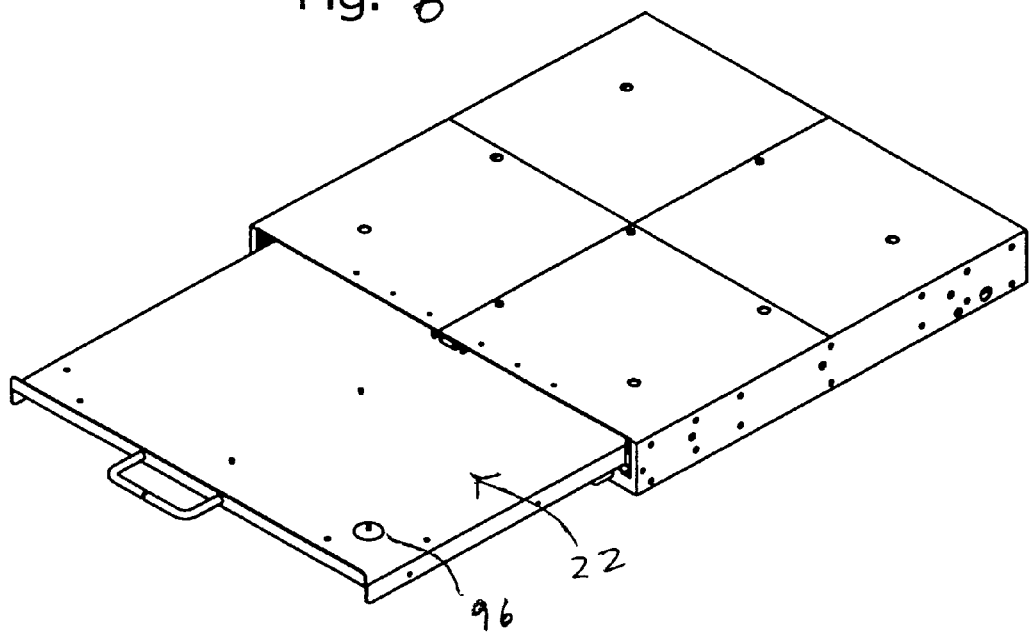
FIG. 6 is a perspective bottom view of the bucky assembly of the present invention.

Further structural and operative features associated with at least one preferred embodiment of the bucky assembly 10 include one or more permanently fixed magnets 96 attached to the undersurface of the tray 22. As represented in FIG. 6 the one or more magnets 96 are disposed and structured to facilitate automatic grid sensing, when the digital sensor or sensor plate 32 is in both the landscape and portrait orientations. Yet additional structural features of at least one preferred embodiment of the present invention may include a rotating direct radio graphic sensor including cooperative structure thereon and/or on the tray 22, which facilitates selective placement, through rotation, of the digital sensor 32 in either of the aforementioned operative orientations including the portrait orientation or the landscape orientation.

Accordingly, the bucky assembly 10 of the present invention overcomes numerous disadvantages and problems associated with retrofitting conventional x-ray devices or facilities using conventional film type buckys to that of a digital imaging system.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A modified grid cabinet assembly structured to be used with a digital imaging system, said modified grid cabinet assembly comprising:
   a frame, and
   a tray movably connected to the frame and selectively positionable between an open position and a closed position,
   said tray structured to support and position a digital sensor into an imaging position and including a retaining assembly including a plurality of retaining members removably connectable to the digital sensor,
   said retaining assembly disposed and structured to removably retain the digital sensor in any of a plurality of operative orientations,
   said operative orientations comprising a portrait orientation and a landscape orientation,
   said plurality of retaining members structured to removably connect the digital sensor to said tray in either of said portrait or landscape orientations,
   wherein each of said plurality of retaining members includes a first receiving recess disposed to receive and retain said digital sensor in the portrait orientation; and
   wherein each of said plurality of retaining members further includes a second receiving recess disposed to receive and retain said digital sensor in the landscape orientation.

2. A modified grid cabinet assembly as recited in claim 1 wherein said tray is reciprocally slidable into and out of said open and closed positions.

3. A modified grid cabinet assembly as recited in claim 2 wherein said tray is removably secured in said open position, said tray comprising a platform having sufficient stability to facilitate the insertion and removal of the digital sensor relative thereto when in said open position.

4. A modified grid cabinet assembly as recited in claim 1 wherein said tray is removably secured in said open position and comprises a platform having sufficient stability to facilitate insertion and removal of the digital sensor relative thereto when in said open position.

5. A modified grid cabinet assembly as recited in claim 4 further comprising a latch assembly disposed in interconnecting relation between said frame and said tray and structured to removably secure said tray in said open position.

6. A modified grid cabinet assembly as recited in claim 1 wherein said frame is dimensioned and configured to be operatively fitted in a standard film bucky compartment.

7. A modified grid cabinet assembly as recited in claim 1 further comprising a sensor assembly connected to said tray and structured to determine appropriate grid positioning when said digital sensor is in any of said plurality of operative orientations.

8. A modified grid cabinet assembly as recited in claim 1 wherein one or more of said plurality of retaining members is secured in a fixed position on said tray.

9. A modified grid cabinet assembly as recited in claim 8 wherein said plurality of retaining members are disposed and structured to removably retain corner portions of the digital sensor.

10. A modified grid cabinet assembly as recited in claim 1 wherein one or more of said plurality of retaining members further comprise at least one channel to permit the passage of power cords, cables, or like structures attached to said digital sensor.

11. A modified grid cabinet assembly as recited in claim 1, wherein each of said first receiving recess of each retaining member is structured and disposed to removably engage a corner of the digital sensor when the digital sensor is disposed in the portrait orientation, wherein each of said second receiving recess of each retaining member is structured and disposed to removably engage a corner of the digital sensor when the digital sensor is disposed in the landscape orientation.

12. A modified grid cabinet assembly structured to be used with a digital imaging system, said modified grid cabinet assembly comprising:
   a frame,
   a tray slidably connected to said frame and positionable between an open position and a closed position, said tray structured to removably support and dispose a digital sensor in an imaging position, and
   a retaining assembly connected to said tray and including a biasing structure removably engaging the digital sensor,
   said tray and said retaining assembly cooperatively structured to removably retain the digital Sensor in either a portrait orientation or a landscape orientation, and
   said retaining assembly comprising a plurality of retaining members each secured in a fixed position on said tray and removably disposed in retaining engagement with a correspondingly disposed corner portion of the digital sensor,
   wherein each of said plurality of retaining members includes a first receiving recess configured to receive and retain said digital sensor in said portrait orientation, and wherein each of said plurality of retaining members includes a second receiving recess configured to receive and retain said digital sensor in said landscape orientation.

13. A modified grid cabinet assembly as recited in claim 12 wherein said frame is dimensioned and configured to be operatively fitted in a standard film bucky compartment.

14. A modified grid cabinet assembly as recited in claim 12 wherein one or more of said plurality of retaining members further comprise at least one channel to permit the passage of power cords, cables, or like structures attached to said digital sensor.

15. A modified grid cabinet assembly as recited in claim 12, wherein each of said first receiving recess of each retaining member is structured and disposed to removably engage a corner of the digital sensor when the digital sensor is disposed in the portrait orientation, wherein each of said second receiving recess of each retaining member is structured and disposed to removably engage a corner of the digital sensor when the digital sensor is disposed in the landscape orientation.

* * * * *